United States Patent [19]

Lewis et al.

[11] Patent Number: 4,924,902
[45] Date of Patent: May 15, 1990

[54] HYDRAULIC CONTROL VALVES

[75] Inventors: Thomas F. Lewis; John E. Ochsenreiter, both of Erie, Pa.

[73] Assignee: Snap-Tire, Inc., Erie, Pa.

[21] Appl. No.: 849,150

[22] Filed: Apr. 7, 1986

[51] Int. Cl.[5] ............................................. F15B 13/02
[52] U.S. Cl. ..................................... 137/270; 137/271; 137/596.16; 137/596.18; 137/625.64
[58] Field of Search ..................... 137/269, 270, 270.5, 137/271, 596.16, 596.18, 625.64

[56] References Cited

U.S. PATENT DOCUMENTS

| 2,656,846 | 10/1953 | Anderson | 137/270 X |
| 3,487,848 | 1/1970 | Leibfritz et al. | 137/271 |
| 3,653,396 | 4/1972 | Logan | 137/270 |
| 4,418,711 | 12/1983 | Stoll et al. | 137/269 |
| 4,513,780 | 4/1985 | Evans | 137/270 |
| 4,520,841 | 6/1985 | Brand et al. | 137/270 |
| 4,616,674 | 10/1986 | Bardoll | 137/596.16 X |
| 4,617,967 | 10/1986 | Read et al. | 137/525.64 |
| 4,643,225 | 2/1987 | Imhof | 137/625.64 X |

FOREIGN PATENT DOCUMENTS 82865 6/1980 Japan ........................ 137/596.16

Primary Examiner—Gerald A. Michalsky
Attorney, Agent, or Firm—Woodling, Krost & Rust

[57] ABSTRACT

A set of components for creating various spool-type directional control valves. By rearranging the spools and springs, or reversing one or more spools end-to-end, valves with different desired and preselected flow patterns can be made from the same components.

12 Claims, 4 Drawing Sheets

| ORIENTATIONS | 2 POSITION | 3 POSITION |
|---|---|---|
| | $(L_1)(L_2)$ $L_1L_2$ | $L_1L_2$ |
| L, R BOTH ORIGINAL |  (1.) $(P)(T)$ P T |  (2.) P T |
| L IS REV. R IS ORIGINAL |  (3.) |  (4.) |
| L IS ORIG., R IS REVERSE |  (5.) |  (6.) |
| L, R, BOTH REVERSE |  (7.) |  (8.) |

| 2 POSITION | 3 POSITION |
|---|---|
|  (1.) |  (2.) |
|  (3.) |  (4.) |
|  (5.) |  (6.) |
|  (7.) |  (8.) |

HYDRAULIC CONTROL VALVES

This invention relates to valves for hydraulic systems. In particular, it relates to improvements in directional control valves for transmissions and other applications.

BACKGROUND OF THE INVENTION

A directional control valve, as the name connotes, controls the flow path patterns in a hydraulic or pneumatic system. Interposed between ports in the system, it directs the fluid flow in various ways between these ports, or stops the flow at some of the ports, in a predetermined pattern according to its position. Most directional control valves have either two or three working positions, each determining a different flow pattern; generally, the more ports a valve serves, the more positions it will have. The position of a valve is determined by one or more operators, also called actuators. Operators may provide for direct manual control, may follow other components, as by cams, or may be remotely controlled, for example, with solenoids.

A great variety of directional control valve designs exists. One common type of design is the sliding-action spool-type valve. This valve has a cylindrical spool which slides axially in a cylindrical bore with which the ports communicate. The spool has raised sections, called lands, which closely fit the cylindrical bore. Between the lands are sections where the spool diameter is substantially less than that of the bore, so that annular chambers are created. Axial flow across a land on the outside of the spool is prevented, but if two ports both open into the bore at points not separated by a land, they are permitted to communicate via the annular chamber between the spool and the bore. A change in axial position of the spool will dispose the lands and annular chambers differently with respect to the ports and thus change the flow pattern.

In a transmission, several types of directional flow functions are ordinarily required, each calling for a different spool configuration, for example, (1) Forward - Neutral - Reverse, calling for a 3-position, 4-way (4 port) valve;
(2) High Clutch - Low Clutch, calling for a 2-position, 4-way valve; and
(3) Torque Converter Lockup, calling for a 2-position, 4-way valve, functioning as a 3-way valve in one position.

SUMMARY OF THE INVENTION

Our invention is a set of components which, though small in number and easily manufactured, may be used to perform various directional control functions. It was designed for transmission clutch pack applications, but its utility, as will be seen, is not limited to transmissions. In particular, the word "hydraulic" will be used herein, but it should be understood to include the pneumatic case also.

The principal feature of the invention is that several various directional control valves, each of which has traditionally required its own especially made spool, are all constructed using only one simple spool type. A common spring is also employed. Two spools are used in each valve assembly. The spool is designed so that by arranging the pair of spools in different orientations, or with the spring differently located, all of the different valve types needed for the transmission may be obtained. The valve body is also common, except that for valves with two solenoids an additional port is provided.

Accordingly, it is an object of our invention to provide novel designs for hydraulic control systems, which are robust and economical to manufacture.

A further object of the invention is to provide a versatile set of easily manufactured components which may be used to create valves of different functions.

Other objects of the invention will be apparent from the discussion to follow herein of a preferred embodiment of the invention, and from the claims and specification, together with the Figures appended hereto, in which FIG. 1 is a cross-sectional view of a 3-position 4-way valve as constructed according to a preferred embodiment of our invention;

FIGS. 4–6, 7a, 7b, and 7c are hydraulic schematic drawings illustrating various embodiments of the invention.

DESCRIPTION OF A PREFERRED EMBODIMENT OF THE INVENTION

Figure 1:
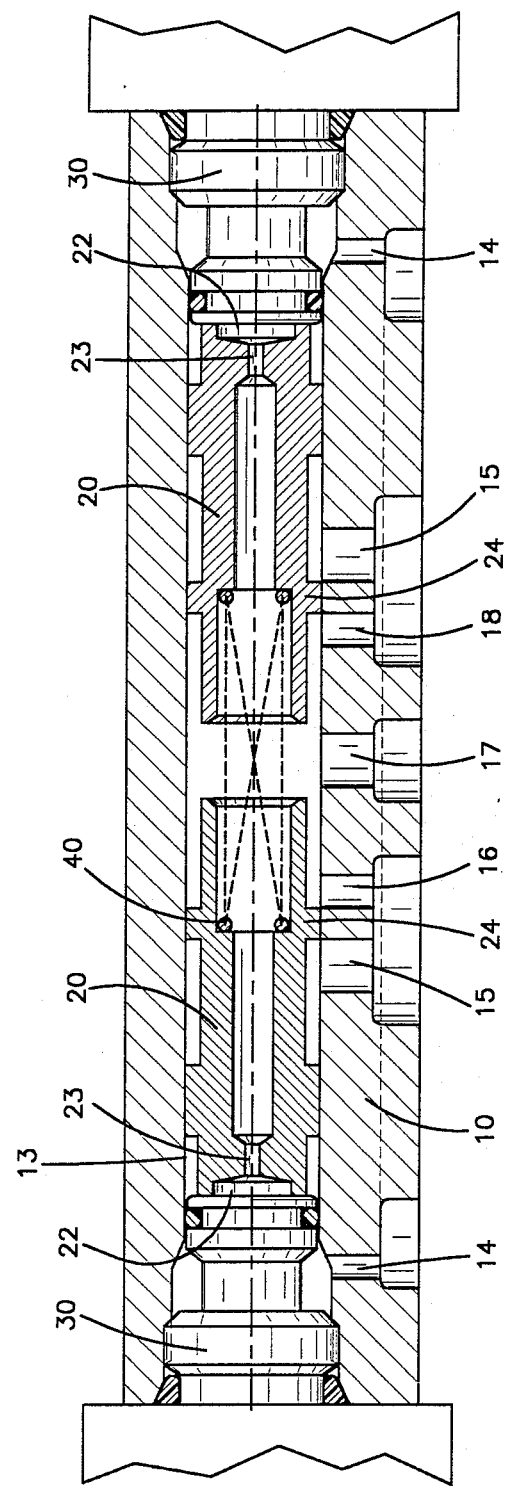

Referring to FIG. 1, our directional control valve has a valve body 10 with two ports 14 and two ports 15 communicating with a pressure source, typically a pump. Cylinder or work ports 16 and 18 in valve body 10 communicate, respectively, to a forward load control and a reverse load control. In the center is a tank port 17 for venting, at atmospheric or reservoir pressure.

Our directional control valve further comprises two identical spools 20, two solenoid valves 30, and a single spring 40 which is of the correct size to fit in recesses 21 in a first end of spools 20. Spring 40 forces each spool 20 outward until it meets the end of a solenoid valve 30. With the spools in these positions (neutral), both work ports 16 and 18 are vented to tank port 17, as seen in the figure. Lands 24 on spools 20 prevent communication between either pressure port 15 and its adjacent work port 16 or 18.

Energizing either solenoid valve 30 opens that solenoid valve 30 and permits fluid at high pressure to flow through the port 14 associated with that solenoid and into the chamber 22 of the spool 20 adjacent to that solenoid valve. An orifice 23 in spool 20 generates a pressure drop to the tank port 17; this pressure drop creates a resultant force that overcomes the opposing force of spring 40. Spool 20 then travels toward the opposing spool and abuts it; when this has happened its land 24 has moved toward the center, connecting pressure port 15, on the side towards solenoid valve 30, to the work port 16 or 18, respectively, depending upon whether solenoid valve 30 is the one on the left or the right. Work ports 16 and 18 are connected to the forward load and reverse load controls, respectively.

When high pressure is removed from chamber 22 by de-energizing solenoid valve 30, the pressure level drops to tank pressure, and spring 40 urges spool 20 back into neutral position.

Figure 2:
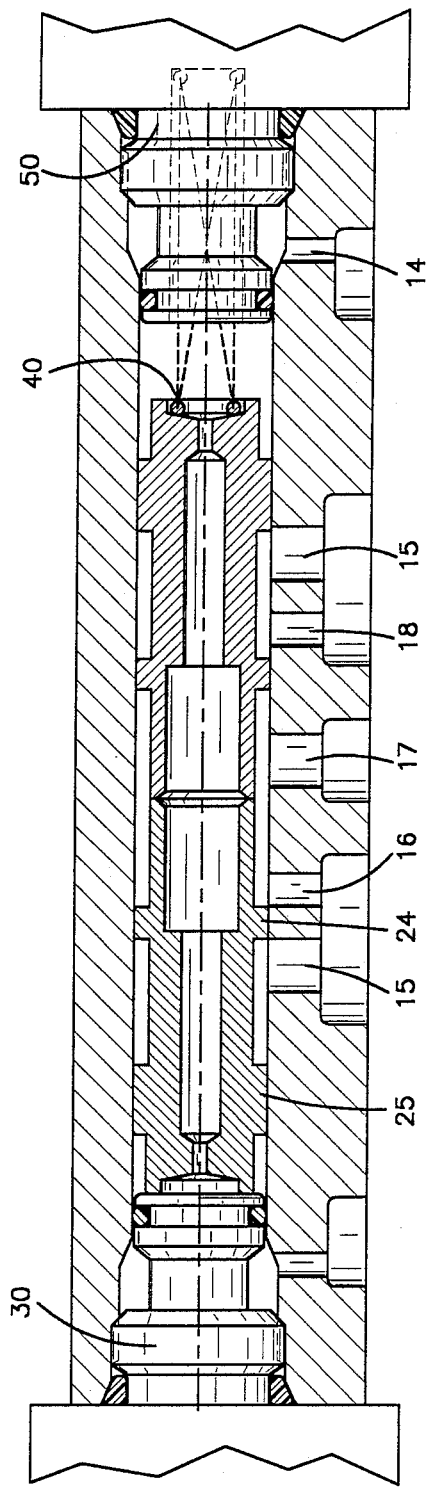
FIG. 2 is a diagrammatic cross-sectional view of a 2-position 4-way valve constructed from the same basic components as the valve of FIG. 1.

Exactly the same spool, spring, solenoid and valve body can be used in a 2-position 4-way valve, as shown diagrammatically in FIG. 2. The right solenoid valve 30 is replaced with a plug 50, and spring 40 has been moved to the right side so that it urges both spools 20 to the left. A valve body without right-hand pressure port 14 is used, or it may be preferred to design port 14 and plug 50 so that plug 50, when employed on one side, simply closes off port 14 on that side.

At rest, work port 16 is connected to tank port 17 and work port 18 is connected to adjacent pressure port 15, as shown. Upon energization of solenoid valve 30, both spools 20 are forced from the left to the right until they abut plug 50. In this state, high pressure fluid can enter work port 16 from its adjacent pressure port 15 to the left, as in the valve of FIG. 1 when the left solenoid valve 30 is energized, but work port 18 is now vented to the tank through tank port 17. This valve arrangement may be used for a high clutch - low clutch control.

Figure 3:
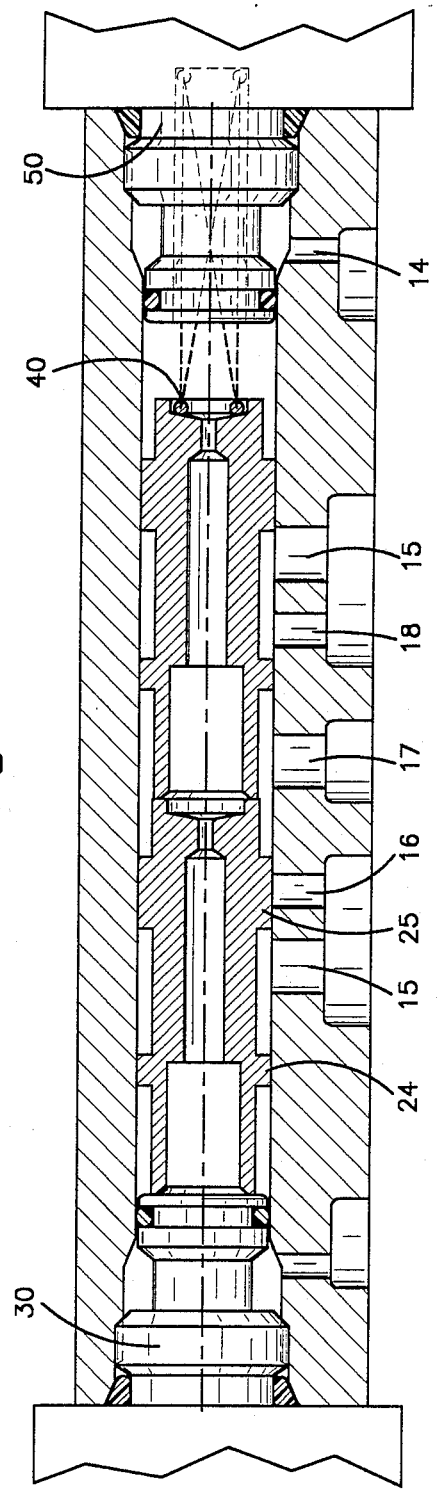
FIG. 3 is a diagrammatic cross-sectional view of a modified 2-position 4-way valve also constructed from the same components.

Another rearrangement of the components is useful for the torque converter lockup function. In FIG. 3, the left-hand spool has been rotated 180 degrees about its longitudinal axis, which redistributes the positions of its lands. This yields an asymmetrical distribution of flow patterns between the two positions. At rest, as seen, high pressure fluid is directed to work port 18 while work port 16 is blocked. Upon energization of solenoid valve 30, both spools travel rightward; work port 16 is then pressurized via port 15 and work port 18 is directed to the tank via tank port 17.

The characteristics of preferred spool 20 which permit its adaptability in the manner described are that it is provided with a recess at each end, or other provision, to carry or support a spring, and that the arrangement of its land or lands is not bilaterally symmetrical, so that a 180 degree end-to-end rotation, and reintroduction to the same place in the bore, disposes the land or lands in a different axial position. It will be clear to one skilled in the art that other desired flow patterns may then be provided for by a suitable spacing of the ports, and that the concept of the invention described herein has wide application. Some examples of design and application follow.

A spool with its first land constructed as shown in the preferred embodiment (land 24) will generate the following flow pattern when its first land is toward center: in its "end" position (left spool leftward or right spool rightward), it connects its load port to tank, and in its "center" position it connects its pressure port to load.

A second land, land 25, is provided in the preferred embodiment. Its location is chosen far enough to the left so as not to interfere with the flow patterns determined by land 24 when the spool is in its original orientation, but so that when the orientation is reversed, i.e., the spool is reversed 180 degree end-to-end, the flow patterns are changed. In the embodiment of FIGS. 1 to 3, land 25 is positioned to cover load port $L_1$ when the spool is in its end position, thus blocking both $L_1$ and its pressure port. When the spool is in center position, its pressure port is connected to load.

A spool with lands according to the described construction will thus have the flow patterns shown in the following table:

| Spool Position | Spool Orientation | |
| --- | --- | --- |
| | Original First land to center | Reversed Second land to center |
| End | Load to T | No connection |
| Center | P to load | P to load |

Figure 4:
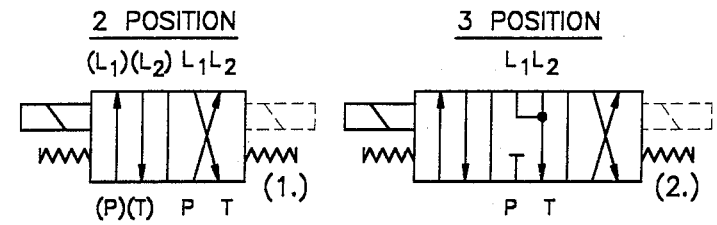
Figure 4:
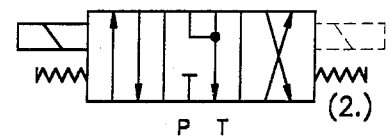
Figure 4:
Figure 4:
Figure 4:
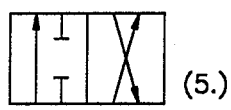
Figure 4:
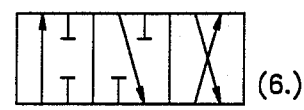
Figure 4:
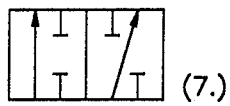
Figure 4:
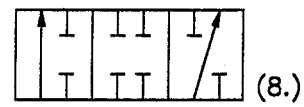

When two identical such spools are combined, the possible flow pattern combinations, for combinations of orientations, are as shown in the hydraulic schematics of FIG. 4. For the 2-position cases, the solenoid can be on either side; one arrangement is shown in (1) with its alternate in dashed lines. The 3-position cases have the spring centered and a solenoid on each end. It will be seen that schematics (1), (2) and (3) are the schematics for FIGS. 2, 1 and 3, respectively.

To illustrate an alternate embodiment, suppose a different spool is constructed, with its first land as before, but its second land so positioned that when its second land is toward center (that is, the spool orientation is Reverse), its pressure port is covered when the spool is in end position but its load port is covered when the spool is in center position. It may be necessary to lengthen both spools and bore to keep the second land far enough away from the first so as not to interfere with the flow patterns in the original spool orientation. The flow patterns of this alternate spool are shown below.

| Spool Position | Spool Orientation | |
| --- | --- | --- |
| | Original | Reversed |
| End | load to T | load to T |
| Center | P to load | no connection |

Figure 5:
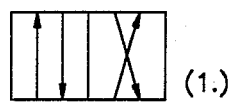
Figure 5:
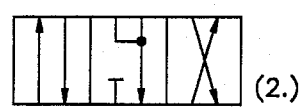
Figure 5:
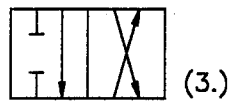
Figure 5:
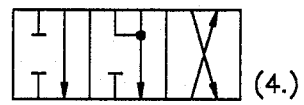
Figure 5:
Figure 5:
Figure 5:
Figure 5:

Combining two identical such alternate spools yields flow pattern combinations as shown in FIG. 5, analogous to FIG. 4.

Figure 6:
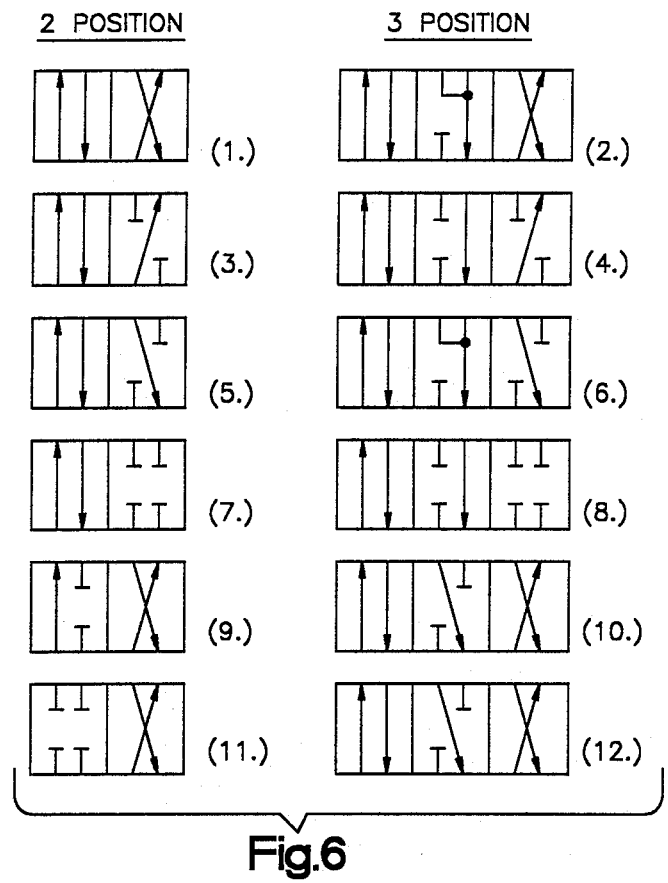

As a further example, if one spool (say, the left) is of the original design and the other of the alternate design, the analogous flow pattern combinations are as shown in FIG. 6(1)–6(8); by reversing the order of the same two spools, additional valves 6(9)–6(12) are created from the same components.

Figure 7A:
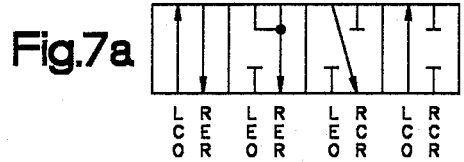
Figure 7B:
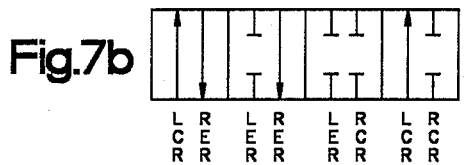
Figure 7C:
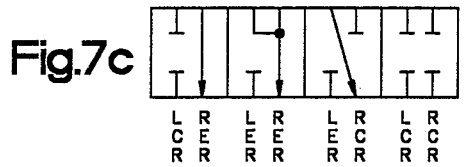

In yet another embodiment of the center-spring type, the porting is arranged so that each spool may, independently of the other, travel so that its end lies on the axial center of the bore when it is in center position. A stop means is provided to arrest spool travel. This will yield a four-position valve; FIG. 7 shows two possible examples with the spools as in FIG. 6, with the right (alternate type) spool in the Reverse orientation, and with the left (original type) spool in either the original orientation (first land toward center, FIG. 7(a)), or the Reversed orientation (second land toward center, FIG. 7(b)). Under each position in each schematic, for convenience, are the spool, spool position, and spool orientation. Finally, FIG. 7(c) shows a four-position valve using both spools of the alternate type, with both spool orientations in the reversed position.

In the most general case, where the porting arrangement into the bore is not axially symmetrical with respect to the axial center of the bore, two identical asymmetrical spools and a spring can be assembled in the bore in twelve different ways, since each spool has two possible orientations and the spring has three possible positions. The eight assemblies in which the spools are abutted with a spring on one end are suitable for two-position valves; the four in which the spring is centered between the spools are suitable for three-position valves.

Of course, the spools need not be identical, but identical spools are preferred for economy and convenience of manufacture. It is also clear that more or fewer than two spools may be employed; for example a set of short spools, each with a single off-center land, would be versatile for some applications, or a single non-symmetrical spool may be used to form two different 2-position valves.

The invention has been described in detail with particular emphasis on the preferred embodiments thereof, but it should be understood that variations and modifications within the spirit and scope of the invention may occur to those skilled in the art to which the invention pertains.

What is claimed is:

1. A set of components for assembly of spool-type directional control valves, said set comprising
   a spring;
   a first and a second spool;
   wall means at a first end of said first spool and at both ends of said second spool, adapted to receive said spring, so that said spools and spring may be assembled in a first arrangement with said spring between said spools or in a second arrangement with said spools abutted and said spring at an end of said second spool;
   a valve body having a bore adapted to receive said spools and spring slidingly therein and having port means opening directly into said bore;
   first operator means adapted to move either of said spools in said bore, against said spring, when said spools and spring are assembled in said first arrangement, so that first, second and third positions are generated for said first arrangement;
   second operator means adapted to move both of said spools together in said bore, against said spring, when said spools and spring are assembled in said second arrangement, so that first and second positions are generated for said second arrangement;
   land means and annular chamber means upon said spools so disposed as to bring about a first, second and third desired flow pattern between said port means when said spools and spring are in said first, second and third positions, respectively, of said first arrangement, and to bring about a fourth and a fifth desired flow pattern between said port means when said spools and spring are in said first and second positions, respectively, of said second arrangement.

2. The set of components of claim 1 and in which said spring has first and second ends, and said spools are substantially identical, each said spool having a first and a second end and being adapted on each of said spool ends to carry either of said spring ends.

3. The set of components of claim 1 and in which said bore has an axial center and said post means comprises ports bilaterally symmetrically disposed with respect to said axial center.

4. The set of components of claim 3 and in which said ports comprise a tank port located at said axial center.

5. The set of components of claim 3 and in which said ports comprise a first and a second pressure port, said pressure ports being bilaterally symmetrically disposed with respect to said axial center.

6. The set of components of claim 3 and in which said ports comprise a first and a second load port, said load ports being bilaterally symmetrically disposed with respect to said axial center.

7. The set of components of claim 3 and in which said ports comprise a tank port located at said axial center, first and second pressure ports bilaterally symmetrically disposed with respect to said axial center, and first and second load ports bilaterally symmetrically disposed with respect to said axial center, said first pressure and load ports being on a first side of said tank port and said second pressure and load ports being on the second side of said tank port.

8. The set of components of claim 7 and in which said load ports are located at a first distance from said tank port and said pressure ports are located at a second distance, greater than said first distance, from said tank port.

9. The set of components of claim 8 and in which said first spool is adapted to move between an end and a center position in said bore, and said first spool has a first land, said first land being located between said first pressure and said first load ports when said first spool is in said end position and said first land being located between said first load port and said tank port when said first spool is in said center position.

10. The set of components of claim 9 and in which said first spool has a second land so disposed thereupon that if the orientation of said first spool is reversed in said bore said second land will be located so as to cover said first load port when said first spool is in said end position and to lie between said first load port and said tank port when said first spool is in said center position.

11. The set of components of claim 10 and in which said second spool is substantially identical to said first spool.

12. The set of components of claim 1 and in which
   at least one of said spools is reversible end-to-end in said bore and said at least one spool has a land located at a distance from a first end thereof and an annular chamber located at the same said distance from a second end thereof, such distance being such that when said at least one spool is reversed, at least one of said first through fifth flow patterns is altered to a sixth desired flow pattern.

* * * * *